Figure 1:
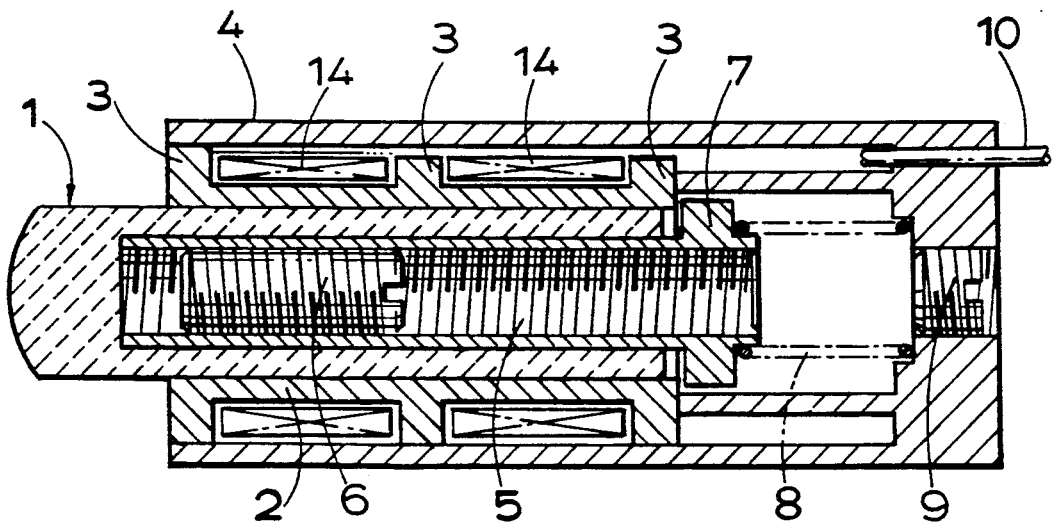

United States Patent [19]
Burton

[11] Patent Number: 5,136,789
[45] Date of Patent: Aug. 11, 1992

[54] VARIABLE INDUCTANCE TRANSDUCERS

[75] Inventor: Barrie C. Burton, Rugby, Great Britain

[73] Assignee: System E Controls Limited, Leamington Spa, England

[21] Appl. No.: 624,632

[22] Filed: Dec. 10, 1990

[30] Foreign Application Priority Data

Dec. 8, 1989 [GB] United Kingdom ............... 8927806

[51] Int. Cl.$^5$ .............................................. G01B 7/00
[52] U.S. Cl. ..................................... 33/558; 33/559; 33/501.6; 33/DIG. 5
[58] Field of Search ................ 33/558, 561, 501.6, 33/556, 559, DIG. 5

[56] References Cited

U.S. PATENT DOCUMENTS 3,193,937  7/1965  Aller ........................... 33/558

FOREIGN PATENT DOCUMENTS 204478  3/1966  Sweden ........................... 33/556

OTHER PUBLICATIONS

American Machinist/Metalworking Mfg. Jan. 21, 1963, pp. 98–99.

Primary Examiner—Harry N. Haroian
Attorney, Agent, or Firm—Oblon, Spivak, McClelland, Maier & Neustadt

[57] ABSTRACT

A linear variable inductance transducer of the kind in which a spring-loaded plunger containing a magnetic core is axially movable in a stationary housing containing a coil assembly has the external surface of the plunger made of ceramic material, guided linearly solely by sliding in a ceramic bearing sleeve in the housing. The bearing sleeve may itself be flanged to form a bobbin for the coil assembly.

21 Claims, 1 Drawing Sheet

VARIABLE INDUCTANCE TRANSDUCERS

This invention relates to variable inductance transducers of the kind used for detecting small linear displacements and comprising a housing supporting a coil in which there is a movable core connected to a probe head.

Such transducers are used in engineering metrology, for example for detecting and measuring very small movements of tool slides in machine tools, or for measuring the dimensions of the workpiece that is being machined or ground. The movements to be detected are of the order of microns.

The typical normal transducer of this kind is a cylindrical body 8 mm or 10 mm in diameter and between 35 and 70 mm long. It comprises the following major components:
1. A hardened tip to engage the surface to be measured
2. A lengthwise sliding plunger carrying that tip
3. A dirt shield, usually rubber or plastic bellows
4. A longitudinal sliding bearing, typically a ballbushing, to locate and guide the plunger with minimum friction, long life and, freedom from lateral play.
5. A pin and slot or equivalent device to prevent rotation of the longitudinally moving parts
6. A soft iron (or similar) core attached to the plunger
7. Stationary coils enclosing the core
8. A ferromagnetic cylindrical housing for supporting the above components and forming a mounting
9. A flexible multi-core cable that needs to be securely anchored to the housing.

Because the moving component, normally the tip, plunger, ball bushing, and core are arranged in series it is difficult to reduce the overall length of the transducer below about 30 mm. This imposes a severe restraint on its use, and prevents it being used in many situations where space is restricted. Users are sometimes forced to resort to the introduction of displacement-transmitting two-armed or bell-crank levers, with the obvious danger of errors being introduced.

Moreover, it is evident from the above list that these known transducers involve a substantial number of components which have to be separately manufactured and assembled together with great precision. The correct positioning of the core in relation to the tip may require the device to be assembled and taken apart a number of times before it is right. All these factors make the ultimate product expensive to produce to the required quality and accuracy, yet they have hitherto been considered essential if a satisfactory result is to be obtained.

It is true that in our own earlier British Patent Specification No. 2 065 891 we have disclosed and covered a revised layout in which the core is within the axial length of the bearing, and this has certainly reduced very substantially the overall length of the device, but although this product has been very successful, it has still been difficult to set up and it still involves a substantial number of separate components.

The aim of the present invention is to put forward a transducer probe which, while retaining the accuracy and durability of the existing constructions, is simpler in construction, involving fewer parts, and also easier to set up.

According to the invention in its broadest aspect we construct a variable inductance transducer in the form of a bearing sleeve of ceramic material in which there moves a plunger which is likewise made of ceramic material and which slides directly in the material of the bearing sleeve, without any ball bushing or other separate rolling bearing structure.

We preferably go further in the elimination of parts, in that we shape the bearing sleeve in which the probe slides so that the bearing sleeve itself forms the bobbin on which the coil assembly is wound, so no separate bobbin is needed. Furthermore we may make the tip or head of the plunger integral with the remainder of it.

Up to now it has been thought essential to provide some kind of ball bushing or other linear bearing and that metal was the only choice for the main components of the transducer. Plastics are clearly unsuitable as they are not sufficiently dimensionally stable, they are thermally sensitive, and some indeed absorb moisture. Unexpectedly we have found that a ceramic plunger sliding directly in a ceramic bearing sleeve can work perfectly satisfactorily.

The virtually zero clearance between the relatively moving parts which can be achieved with the very dimensionally stable and low thermal-expansion properties of ceramic means that dirt cannot penetrate and it is possible to eliminate also the bellows or equivalent dirt shield that is essential to protect the ball bushing in the known constructions.

As the plunger is non-metallic the core can be mounted directly inside it, and if the core is chosen to be of a known commercially available ferrite type with an external screw-thread it can be mounted in a female thread within the plunger and its axial position can then be very easily adjusted, in setting up the probe, by the use of a screwdriver through the rear end of the assembly, or, if the tip is detachable, through the front end.

Figure 2:
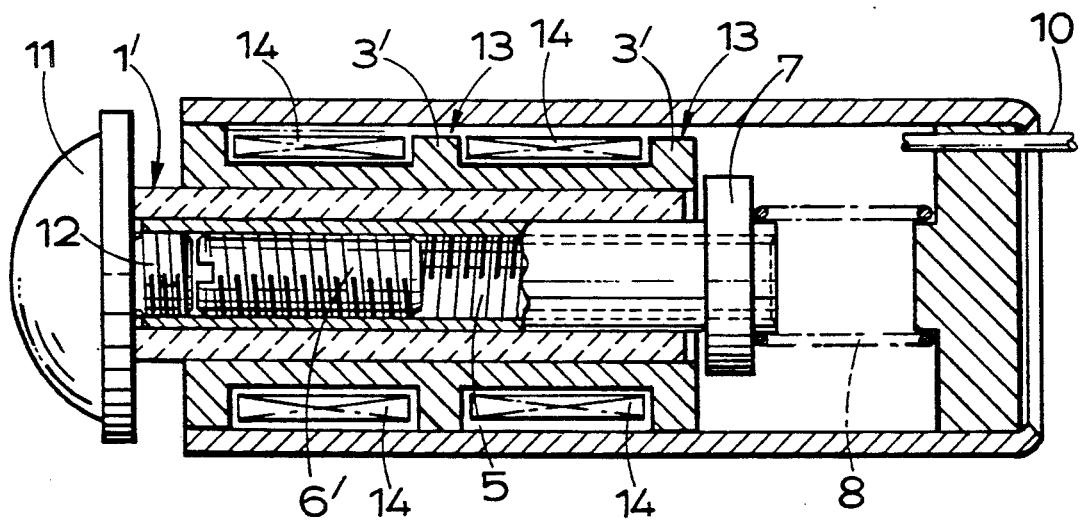

Two examples of transducers according to the invention will now be described briefly with reference to the accompanying drawings, of which FIGS. 1 and 2 are diagrammatic longitudinal sections through each of them respectively.

The transducer shown in FIG. 1 comprises basically a cylindrical combined plunger and tip 1 made of ceramic material, sliding directly in a bearing sleeve 2 which is also made of ceramic material and which, as will be seen, has its external surface provided with flanges 3 so that it also forms the bobbin on which is directly wound a coil assembly 14 having one or more coils. Thanks to the very high dimensional stability of ceramics and their negligible thermal expansion, the clearance between the plunger and sleeve can be extremely small without any risk of jamming or friction, and there is no need for a dirt shield.

The front flange 3 forms a front wall for a housing which is completed by a cylindrical outer steel casing 4 which also forms a rear end cap, and provides the necessary shielding of the coil assembly 14 against external magnetic fields.

Within the hollow plunger 1 is a linear member 5 made of suitable synthetic material, for example Paxolin (Registered Trade Mark), secured by adhesive, and provided with an internal screw thread to receive an externally threaded ferrite core 6. A flange 7 on the rear end of the linear member 5 provides a shoulder to engage the rear end of the ceramic sleeve 2 and define the forward limiting position of the plunger. A helical coil compression spring 8 urges the plunger to this forward position.

It is important that the axial position of the ferrite core 6 in relation to the tip of the plunger is exactly right, generally being required to be in the middle of the coil assembly 14 when the plunger is in the forward position shown. In the transducer according to the invention this adjustment is particularly easily performed without taking the transducer apart, as it can be done with a screwdriver through an access opening in the end cap, this opening being afterwards closed by a screwed plug 9.

The use of a ferrite core results in a much greater signal than a soft iron core. In the previous constructions ferrite could not be used because the core had to be a hollow sleeve to suit the geometry involved, and ferrites are too weak to form a thin walled sleeve.

The cable 10 providing connections to the coil assembly is brought out through the end cap. The rearmost flange 3 on the bearing sleeve 2 has a notch or flat (not shown) to provide clearance for the individual wires. According to a further feature of the invention terminal pads for the wires may be formed by electro-plating directly onto the rear face of that flange, making it particularly easy to attach the wires of the cable by soldering at this point.

In the known transducers it has always been necessary to provide some means for preventing the plunger rotating, usually a radial pin engaging in a slot in the housing. This was necessary because it was impossible to ensure that all the components were truly concentric, and so rotation could alter the accuracy of the transducer. Thanks to the simplicity of the construction according to the invention the core can be kept truly concentric with the coil assembly, and so the plunger can be left free to rotate, thus further simplifying the construction and eliminating components.

The choice of ceramic materials can be determined by experiment, and to suit the environment in which the transducer is to work. Generally speaking, silicon carbides or nitrides are suitable. The material must, of course, be non-ferromagnetic.

One ceramic material which is particularly suitable is that marketed under the Registered Trade Mark "Syalon 201". It is based on silicon nitride, with aluminium oxide in solid solution, and has very stable characteristics, with virtually zero thermal expansion and high resistance to chemical attack and to impact. The clearance between the plunger and bearing sleeve can be virtually zero since they are both of the same material and therefore even the microscopic amount of thermal expansion that exists is equal in both.

In FIG. 2 the same reference numerals have been used for the same components as those present in FIG. 1. Almost the only difference is that the tip, shown at 11, is not integral with the ceramic plunger but is a separate formed component which has a spigot 12 on its rear end by which it is screwed into the linear member 5. Instead of being made of Paxolin the linear member 5 may be of brass.

As the body of the plunger is separate from the tip, the body is now a plain uniform hollow cylinder, free of flanges and changes in diameter, making it easier than the FIG. 1 version to form from ceramic material.

As the tip 11 is detachable, the position of the ferrite core 6' in the linear member 5 can now be adjusted from the front end, by the use of a screwdriver inserted after removal of the tip 11, and so the plug 9 at the rear can be omitted. Also in the embodiment of FIG. 2 the rear end of the spring 8 is seated on a spigot rather than within a socket. The flanges 3' are the full diameter of the inside of the casing 4, and so flats 13, easier to form in a ceramic body than notches, are provided to give clearance for the wires to the coils.

I claim:

1. A variable inductance linear transducer comprising a housing carrying an axially movable plunger with a projecting tip for engaging a body, the movement of which is to be measured, a magnetic core in said plunger and a coil assembly within said housing and enclosing said plunger, wherein the external surface of said plunger is of ceramic material, and further comprising a bearing sleeve of ceramic material within said housing, and said plunger being guided for linear movement solely by being in direct sliding contact in said bearing sleeve, and wherein said sleeve forms a bobbin on which said coil assembly is wound, said bearing sleeve having external flanges for locating said coil assembly, and wherein at least one of said flanges has a flat to provide clearance for electrical connections to said coil assembly.

2. A variable inductance linear transducer comprising a housing carrying an axially movable plunger with a projecting tip for engaging a body, the movement of which is to be measured, a magnetic core in said plunger and a coil assembly within said housing and enclosing said plunger, wherein the external surface of said plunger is of ceramic material, and further comprising a bearing sleeve of ceramic material within said housing, and said plunger being guided for linear movement solely by being in direct sliding contact in said bearing sleeve, and wherein the body of said plunger is a plain hollow cylinder of ceramic material, substantially free of flanges, and said body contains an internal sleeve of non-ceramic material in which said core is mounted.

3. The transducer set forth in claim 2 wherein said internal sleeve further incorporates an external flange which forms a stop limiting the travel of said plunger.

4. The transducer set forth in claim 2 wherein said internal sleeve is internally screw-threaded and said core is screwed into it, the axial position of said core in said plunger being thereby adjustable by the use of a tool from an end of the transducer.

5. A variable inductance linear transducer comprising a housing carrying an axially movable plunger with a projecting tip for engaging a body, the movement of which is to be measured, a magnetic core in said plunger and a coil assembly within said housing and enclosing said plunger, wherein the external surface of said plunger is of ceramic material, and further comprising a bearing sleeve of ceramic material within said housing, wherein said plunger has first slide guiding means extending over a guide region of its longitudinal length, and said bearing sleeve has second slide guiding means extending over a guide region of its longitudinal length, said first and second slide guiding means being in direct sliding contact with each other and said plunger being guided for linear movement solely by said direct sliding contact between said first and second slide guiding means, and wherein said core is disposed in said plunger at a longitudinal position of said plunger at which said first and second slide guiding means co-operate.

6. A variable inductance linear transducer comprising a housing carrying an axially movable plunger with a projecting tip for engaging a body, the movement of which is to be measured, a magnetic core substantially wholly within said plunger and a coil assembly within said housing and enclosing said plunger, wherein the external surface of said plunger is of ceramic material, and further comprising a bearing sleeve of ceramic material within said housing, and said plunger being guided for linear movement solely by being in direct sliding contact in said bearing sleeve.

7. The transducer set forth in claim 6 wherein said core is disposed adjacent said tip.

8. The transducer set forth in claim 6 wherein said core is a solid, non-hollow, ferrite core.

9. The transducer set forth in claim 7 wherein the ceramic material of the external surface of said plunger is the same ceramic material as that of said bearing sleeve.

10. The transducer set forth in claim 7 wherein the main body of said plunger, apart from said core, is of ceramic material.

11. The transducer set forth in claim 10 wherein said tip is integral with said plunger.

12. The transducer set forth in claim 11 wherein the body of said plunger is a cylinder with one closed end forming said integral tip.

13. The transducer set forth in claim 7 wherein said bearing sleeve forms a bobbin on which said coil assembly is wound.

14. The transducer set forth in claim 13 wherein said bearing sleeve comprises external flanges for locating said coil assembly and at least one of said flanges has a flat to provide clearance for electrical connections to said coil assembly.

15. The transducer set forth in claim 10 wherein the body of said plunger is a plain hollow cylinder of ceramic material, substantially free of flanges, and said body contains a liner member of non-ceramic material in which said core is mounted.

16. The transducer set forth in claim 15 wherein said liner member further incorporates an external flange which forms a stop limiting the travel of said plunger.

17. The transducer set forth in claim 15 wherein said liner member is internally screw-threaded and said core is screwed into it, the axial position of said core in said plunger being thereby adjustable by the use of a tool from an end of the transducer.

18. A variable inductance linear transducer comprising a housing carrying an axially movable plunger with a projecting tip for engaging a body, the movement of which is to be measured, a magnetic core provided inside said plunger and a coil assembly within said housing and enclosing said plunger, wherein the external surface of said plunger is of ceramic material, and further comprising a bearing sleeve of ceramic material within said housing, and said plunger being guided for linear movement solely by being in direct sliding contact in said bearing sleeve, said plunger and said bearing sleeve having complementary smooth parallel sides which co-operate with each other to guide sliding movement therebetween.

19. The transducer set forth in claim 18 wherein said plunger and said bearing sleeve are of uniform cross section over substantially their entire longitudinal length.

20. A variable inductance linear transducer comprising a housing carrying an axially movable plunger with a projecting tip for engaging a body, the movement of which is to be measured, a magnetic core inside said plunger and a coil assembly within said housing and enclosing said plunger, wherein the external surface of said plunger is of ceramic material, and further comprising a bearing sleeve of ceramic material within said housing, and said plunger being guided for linear movement solely by being in direct sliding contact in said bearing sleeve, and wherein said plunger defines a hollow cavity in which said core is adjustably mounted, said plunger having an access aperture at one end whereby access to said cavity is afforded to enable the position of said core relative to the longitudinal length of said plunger to be adjusted.

21. The transducer set forth in claim 20 wherein said core is coupled to said plunger via a screw thread, adjustment of said position of said core relative to said plunger being afforded by screwing said core forwards or backwards.

* * * * *